UNITED STATES PATENT OFFICE 2,402,845

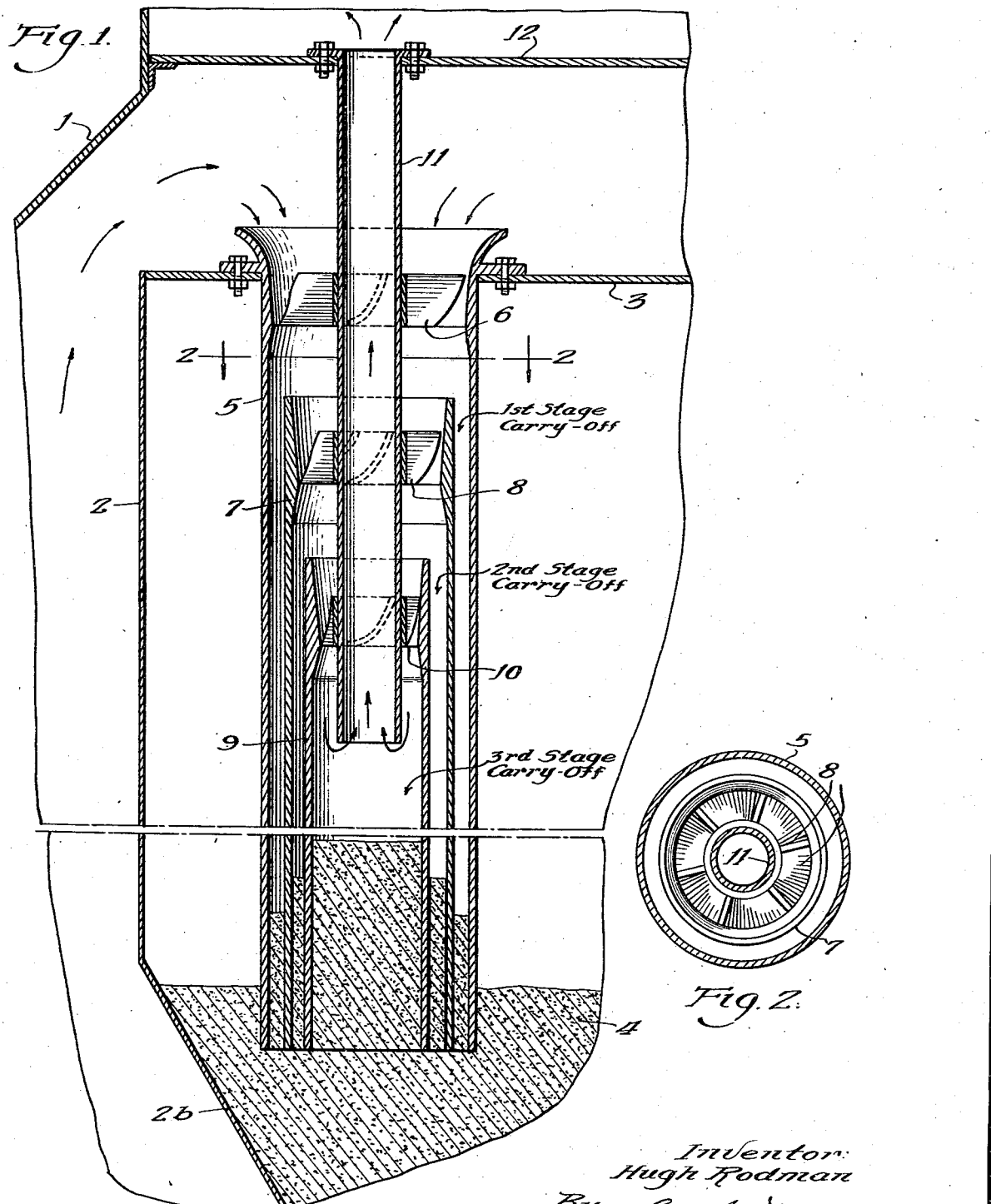

MULTIPLE STAGE CYCLONIC SEPARATOR

Hugh Rodman, Oak Park, Ill., assignor to Universal Oil Products Company, Chicago, Ill., a corporation of Delaware Application November 29, 1944, Serial No. 565,730

2 Claims. (Cl. 183—106)

This invention relates to an improvement in the cyclone type of separator for separating finely divided and suspended particles from a fluid stream. The new form of the device provides stages of increasing velocity of fluid flow and makes a particle separation for each velocity stage. More specifically the invention is concerned with a device for the improved separation of suspended particles from a fluid stream containing the same, by providing for successive separations in a plurality of stages. It in addition provides for increasing linear velocity and angular or "spinning" velocity in the separate stages and means in each stage permitting the withdrawal of the separated solids. In general, the higher the angular velocity, the greater is the removal of the extra fine particles and also the greater is the overall efficiency of the device.

This type of device is particularly adapted for removing finely divided solids or dust from gaseous or vaporous streams. In the cyclone type of separator the gases and the entrained solids are passed through in a manner that imparts a swirling motion to them. Solid particles are thus thrown by the centrifugal action to the outer wall where they are skimmed off, or as in the case of this apparatus are allowed to slide down the wall into a collecting hopper.

One object of this invention is to increase the efficiency of the cyclone tube or "multi-clone" type of separator by providing two or more different stages of separation, using two or more concentric collecting or separating tubes and a corresponding number of sets of directional vanes. With the tubes and vanes arranged in a manner such that the gaseous flow is given a centrifugal swirling action by the first set of vanes and a first-stage particle separation taking place against the outer collecting tube, the gases then flow through the successive sets of vanes and tubes with separation of successively finer particles being made at each stage. As the gases enter the intermediate tubes and vanes, the flow area becomes more restricted so that the linear velocity of flow is therefore increasingly greater through each of the successive stages. In addition, the vanes may be given a greater angularity or different curvature to give further increased spinning velocity to the gases making possible, and resulting in a very efficient apparatus.

The fluidized catalyst cracking process for hydrocarbon vapors has made wide use of the cyclone and centrifugal method of separation. Enormous amounts of catalyst are handled in these units and it is necessary to separate the suspended or entrained particles of catalyst from exit streams so that they may be returned to the processing zone with a minimum or a controlled amount of catalyst being lost.

Present fluidized catalyst cracking units employing the cyclone and "multi-clone" separators in plurality and in sequence operate at an efficiency such that a secondary step of different principle is needed for obtaining the desired overall efficiency. Also it has been found that excessive erosion has been taking place on the outer separation tube of the present type of single-stage "multi-clone."

A further object and improvement obtained by the new form of separator, is that the erosion possibilities are minimized at the same time that efficiency is increased. A large portion of the suspended solids, particularly the coarser particles are removed in the first-stage separation at a relatively low velocity, while successive stages will separate successively finer particles. Although these later stages will have higher velocities, they will handle relatively small amounts of very fine suspended particles only, and the erosion will not be excessive with the absence of coarse particles.

In a specific embodiment, the device comprises three concentric separating or collecting tubes, a corresponding number of sets of directional vanes, and a central gas outlet tube. The outer collecting tubes will be long, extending so that their lower ends will be submerged in catalyst or dust in a collecting hopper below the separators. The tubes and vanes are arranged so that the gas or vapor flow is downward through the vanes and upper portions of the collecting tubes. However, the flow of the cleaned gas, after passing through the last separating stage, reverses and flows upward and out of the central outlet tube.

Where a large quantity of vaporous material with entrained solids must be handled, a plurality of these multiple tube devices may be used in the same manner as the present types of cyclone tubes are used, by having a plurality of these separating devices discharging into a common closed hopper, and a tube sheet across the top of the hopper, for sealing off this collecting hopper, and from which the outer collecting tubes may be suspended. The plurality of vapor outlet tubes may be suspended from an upper tube sheet, which in turn can seal off the cleaned vapor outlet portion of the process chamber from the remainder of the chamber containing the suspended particles.

In order to make the features and advantages of the invention more apparent, reference is made to the accompanying drawing and the following description thereof.

Figure 1 shows a sectional elevation of one of the multiple stage separators and a portion of the chamber and hopper having the separator mounted therein.

Figure 2 is a sectional plan taken through Figure 1, showing principally a plan view of one of the sets of directional vanes as well as cross-sections through part of the concentric vertical tubes.

In Figure 1, the numeral 1 denotes the shell or upper head of a vessel which may be a fluidized catalyst reactor, or a regenerator, or any other type of vessel containing suspended particles in a gaseous material that require separation before exhausting the latter. A hopper chamber 2 is provided for collecting the removed particles and a tube sheet 3, at the top of the hopper chamber 2, serves to support the separation tubes as well as to close off the hopper chamber 2 from the interior of the vessel 1. Means not illustrated, nor included in this invention, must be provided for removing the separated solids from the bed 4 from the cone shaped bottom 2b of the hopper chamber 2. In the case where the separated material of bed 4 is catalyst, it must be returned for reuse in the conversion process, (for the remainder of this description it will be assumed that the suspended solid being separated is a finely ground catalyst used in a conversion process).

The catalyst laden fluid stream enters the outer separation tube 5, the upper portion of which is flared to provide streamlined and equalized entrance flow to the set of directional vanes 6. These vanes 6 divide the flow into separate centrifugal streams being curved and positioned such that they not only impart centrifugal motion to the gas or vapors, but at the same time provide a downward component so that the entrained particles are thrown out and down against the inner wall of the tube 5 effecting their separation from the fluid stream. The catalyst particles from this first stage of carry-off fall to the collected bed 4. The fluid gas stream after leaving the first-stage vanes 6 enters the top of the next tube 7 and flows through the second set of directional vanes 8. The vanes 8, which are also shown in plan view in Figure 2, effect a second stage of separation in the same manner as described for the first stage; however, the annular area is decreased at this second set of vanes 8 and the resulting increase in axial and "spinning" velocities effect a separation of smaller particles of catalyst which were not previously removed, throwing them against the inner wall of tube 7 from which they will fall to the bed 4 in the hopper. The flow stream then enters the third separation tube 9 and is given a third-stage removal by the set of vanes 10. This stage of removal is carried out at a still higher velocity than the previous stage because of the further restriction in area, thus the very fine catalyst particles are removed, being thrown against the inner wall of the tube 9 from which they fall to the bed 4 below. It is contemplated that the angle of placement as well as the radius of curvature in each set of vanes may be varied from stage to stage to give an increased "spinning" velocity to the material. It also should be noted that all of the tubes 5, 7 and 9 are slightly flared and tapered in a manner to give increased wall thickness at the point near the bottom of each set of vanes where the greatest wear due to erosion will occur. The device of Figure 1 shows only three stages of separation, however, it is not intended to limit this invention, since more than three stages may well be used.

After this last stage of removal the clean gas or vapor enters the bottom of the outlet tube 11 and flows upward to the top of the process chamber 1 from which it is discharged. A tube sheet 12 is provided from which the outlet tube 11 is suspended, this sheet 12 also partitions off the upper clean gas outlet chamber from the rest of the vessel. It may be desired in some cases to suspend the hopper chamber 2 and tube sheet 3 from this upper tube sheet 12, in which case it must be well stiffened, or the hopper 2 may, if desired, be suspended directly from the vessel head 1. The tubes 5 and 11 are indicated as being bolted to their respective tube sheets so that they may be detached for inspection. The inner tubes 7 and 9 as well as the vanes 6, 8, and 10 can be supported in any convenient or desired manner from the tubes 5 or 11; however, they should be installed so that they are easily separable and removable.

To further illustrate the operation of the device, it will be assumed that a plurality of the devices, all similar to the one shown, are installed in the tube sheet 3 and the hopper chamber 2 and are to separate catalyst from cracked hydrocarbon vapors in a fluid catalyst reactor. A portion of the vapors with the entrained catalyst enters one of the separators as shown in the drawing while the remainder of the gas enters similarly mounted separators. The flow is down through the flared entrance nozzle of tube 5 and through the first set of directional vanes 6 which effects a separation of the larger particles of the entrained material, with the removed particles falling down along the inner wall of tube 5 to the top of bed 4. It must be noted that all of the separating tubes, 5, 7 and 9 are made long and must be kept submerged below the top level of bed 4 so that the gas flow will be sealed from passing down around the lower ends of these said tubes, 5, 7 and 9. The level of the bed 4 can be maintained relatively constant by controlling the outlet flow of the collected catalyst from the hopper bottom 2b, by an outletting "dip" pipe and butterfly valve, neither of which are illustrated, and which are the usual outlet means from the hopper bottom 2b. The cracked vapors, after effecting one catalyst separation, enter the top of tube 7 and have a second stage of particle removal by vanes 8 and at higher linear and "spinning" velocities such that smaller catalyst particles are removed and fall down along the inner wall of tube 7 to the bed 4. After effecting this second stage of separation, the vapors enter the tube 9 and flow through the vanes 10, and because of the further restricted flow area, the vapors will be at still higher linear and "spinning" velocities than for the previous stages, so that the very fine catalyst particles will be removed falling down along the inside of tube 9 to the bed 4. The cleaned hydrocarbon vapors being substantially clean of entrained catalyst enter the bottom of the outlet tube 11 and are discharged into the collecting space above tube sheet 12. The cracked vapors are then outlet from the top of the reactor and carried on to the fractionation system.

In many present installations using cyclones or "multi-clones" for catalyst separation, it has been found that the erosion on the separation tubes has been excessive with holes occurring after relative short periods of operation. The improved type of separator comprising this invention will minimize erosion by having the vapor or gas velocity in the first stage of separation, where the major amount of catalyst is removed, low enough to prevent excessive erosion taking place. The successive stages, as previously described, will have increasing velocities of flow, with a flow velocity in the final separating stage that may be much higher than present single stage velocity "multi-clone" installations, however, the amount of catalyst handled becomes less and less for each successive stage and the particles become finer so that erosion is minimized.

While the drawing and preceding description show only three velocity and particle carry-off stages, it is not intended to limit this invention to three separation stages. Also, the use of the device need not be limited to the separation of catalysts in hydrocarbon conversion processes since this device may well be used for separating dust or suspended solids from any fluid stream.

I claim as my invention:

1. A multiple stage cyclone separator comprising vertical, concentrically spaced inner and outer cylindrical tubes open at their upper and lower ends, the upper end of said inner tube being in a lower horizontal plane than the upper end of said outer tube, directional vanes in the upper portion of said outer tube above and spaced from the upper end of said inner tube, directional vanes in the upper portion of the inner tube, means for supplying a suspension of solids in fluid downwardly through the upper end of the outer tube, and an open-ended fluid discharge conduit disposed centrally within said tubes and extending vertically from a point within the inner tube below the vanes in the last-named tube to a point above the upper end of the outer tube, said discharge conduit being spaced from the inner tube and terminating a substantial distance above the lower end of the inner tube.

2. A multiple stage cyclone separator comprising vertical, concentrically spaced inner and outer cylindrical tubes open at their upper and lower ends, an open-ended intermediate tube between and spaced from said inner and outer tubes, the upper ends of said tubes being in successively lower horizontal planes from the outer tube to the inner tube, directional vanes in the upper portion of each of said tubes, the vanes of said intermediate tube being disposed above and spaced from the upper end of the inner tube and the vanes of the outer tube being disposed above and spaced from the upper end of the intermediate tube, means for supplying a suspension of solids in fluid downwardly through the upper end of the outer tube, and an open-ended fluid discharge conduit disposed centrally within said tubes and extending vertically from a point within the inner tube below the vanes in the last-named tube to a point above the upper end of the outer tube, said discharge conduit being spaced from the inner tube and terminating a substantial distance above the lower end of the inner tube.

HUGH RODMAN.